United States Patent [19]

Fagarasan et al.

[11] Patent Number: 5,365,236
[45] Date of Patent: Nov. 15, 1994

[54] AUTOMATIC GLOBAL RADAR/IR/ESM TRACK ASSOCIATION BASED ON RANKED CANDIDATE PAIRINGS AND MEASURES OF THEIR PROXIMITY

[75] Inventors: John T. Fagarasan, Brea; Stephen W. Alland, Pomona; Ronald J. Jakaub, Hacienda Heights, all of Calif.

[73] Assignee: Hughes Aircraft Company, Los Angeles, Calif.

[21] Appl. No.: 38,341

[22] Filed: Mar. 5, 1993

Related U.S. Application Data

[63] Continuation of Ser. No. 916,772, Jul. 17, 1992, Pat. No. 5,317,319.

[51] Int. Cl.$^5$ ............ G01S 17/66; G01S 17/87; G01S 7/50
[52] U.S. Cl. ............ 342/53; 342/59; 342/195; 364/423
[58] Field of Search ............ 342/53, 13, 14, 16, 342/20, 59, 89, 90, 95, 96, 97, 189, 195, 197, 58; 364/423

[56] References Cited

U.S. PATENT DOCUMENTS

| | | | |
|---|---|---|---|
| 4,586,159 | 4/1986 | Thomas et al. | 364/900 |
| 4,797,839 | 1/1989 | Powell | 364/554 |
| 5,062,056 | 10/1991 | Lo et al. | 364/516 |
| 5,072,389 | 12/1991 | Wernli et al. | 364/423 |
| 5,107,271 | 4/1992 | White | 342/195 |
| 5,117,360 | 5/1992 | Holtz et al. | 364/423 |
| 5,144,316 | 9/1992 | Uhlmann et al. | 342/189 |
| 5,184,138 | 2/1993 | Terry et al. | 342/195 |

OTHER PUBLICATIONS

J. W. Thomas, "A Radar -ESM Correlation Discriminant Using Bearing History", JHU/APL Report F3A-79-2-085, Mar. 1979.
G. V. Trunk et al, "Association of DF Bearing Measurements with Radar Tract", IEEE Transactions on Aerospace and Electronic Systems, vol. AES-23, No. 4, Jul. 1987, pp. 438-447.
C. L. Morefield et al, "Data Association Algorithms for Large Area Surveillance", ORSA/TIMS Meeting, ORINCON Corp., May, 1978, La Jolla, CA 1978, DTIC AD-A086606/1.
C. B. Chang et al., "Measurement Correlation For Multiple Sensor Tracking in a Dense Target Environment", Technical Report 549, Lincoln Laboratory, MIT, Lexington, MA, 20 Jan. 1981, DTIC AD-A098001.
C. L. Bowman et al, "Multi-Sensor Multi-Platform-Tract Association Algorithm Using Kinematics and Attributes", IEEE National Aeropace and Electronics Conference, Dayton, May 20-24, 1985, vol. 1, pp. 204-208.
S. S. Blackman, "Multiple-Target Tracking with Radar Applications", Artech House, Norwood, MA 1986.
E. Davis, "The Mission Avionics Sensor Synergism (MASS) Program", Proceedings of the 1987 Tri-Service Data Fusion Symposium, 9-11 Jun. 1987, JHU/APL, Laurel, MD, Published by NADC. Warminster, PA, 1987, pp. 366-372.
W. R. Ditzler et al. "Integrated Multisensor Tracking", Proceedings of the U. S. DoD Tri-Service Combat Identification Systems Conference, Arlington, VA, 1986.
E. Benites et al, "A Demonstration of Multisensor Tracking", Proceedings of the 1987 Tri-ServiceData Fusion Symposium, 9-11 Jun. 1987, JHU/APL, Laurel, MD, Published by NADC, Warminster, PA, 1987, pp. 303-311.
J. T. Fagarasan et al, "Automatic Radar/IR/ESM TRact Association with Application to Ship Self Denfense", Technical Proceedings of the 1989 Tri-Service Data Fusion Symposium, vol. 1, pp. 278-286, 16-18 May 1989.

Primary Examiner—John B. Sotomayor
Attorney, Agent, or Firm—W. K. Denson-Low

[57] ABSTRACT

A tri-sensor track association based on ranked candidate pairs and measures of their proximity is described. The track association employs a three dimensional assignment scheme, simple enough to be implemented in realtime, which preserves the most accurate pairwise links of the highest ranked pairs, requires at least two pairwise links for any tri-sensor global track association, and minimizes the time average statistical bearing displacement between associated tracks.

14 Claims, 7 Drawing Sheets

AUTOMATIC GLOBAL RADAR/IR/ESM TRACK ASSOCIATION BASED ON RANKED CANDIDATE PAIRINGS AND MEASURES OF THEIR PROXIMITY

This is a continuation of application Ser. No. 07/916,772, filed Jul. 17, 1992, now U.S. Pat. No. 5,317,319.

BACKGROUND OF THE INVENTION

The present invention relates to multiple sensor integration (MSI), multiple sensor tracking (MST), and more particularly to the association of tracks generated by three collocated dissimilar sensor systems: radar, infrared (IR), and electronic support measures (ESM).

Radar Systems are commonly used to detect and track targets. Such a radar system includes a radar sensor and a computer. The radar sensor radiates electromagnetic energy, and then detects and measures the echoes returned from reflecting objects. The radar computer processes the radar measurements and uses them to maintain a collection of radar "tracks", where each such track estimates the position, velocity and other attributes of a target, enabling the prediction of the target's position; A radar system typically provides target range, azimuth, range rate, and azimuth rate information for each radar track. Some radars have height finding capability, in which case their radar tracks also include elevation information.

In many military applications, such as ship self-defense systems, other types of sensors, including IR sensors and ESM sensors, may also be used in addition to radar to enhance the detection and tracking of targets and to support the designation of targets to weapon systems.

An infrared sensor system detects infrared radiation. Such a sensor system uses radiation emitted by targets to detect and track targets. An IR track includes azimuth and elevation data, but no range data.

An ESM sensor system detects radio frequency energy. Such a sensor system includes a radio frequency receiver detecting and monitoring electromagnetic emissions from targets, and a processor estimating the waveform parameters, the angle-of-arrival, and the identification of the received signals. An ESM track typically provides bearing (angle-of-arrival), identification and waveform information, but does not include range or elevation information.

The integration of collocated multiple sensors is needed in ownship point defense applications for many reasons. The ownship multi-sensor integration enhances the target acquisition and tracking performance. A target undetectable by the ownship radar due to its small cross section or its position in the radar's multipath nulls may be detected and tracked by the ownship IR sensor, or, in the presence of radio frequency emissions from the target, by the ownship ESM sensor. A track undetectable by the ownship IR sensor due to unfavorable atmospheric conditions may be detected and tracked by the ownship radar and ESM sensor. A track undetectable by the ownship ESM sensor due to the lack of radio frequency emissions may be detected and tracked by the ownship radar and IR sensor. The ownship radar estimate of a target's position and identification may be significantly improved when that target is tracked by all sensors and the multi-sensor integration is performed. The improvement in that case is a result of using the more accurate target azimuth and elevation included in the IR track, and the more accurate target identification included in its ESM track.

The ownship multi-sensor integration may also be dictated by the need to support new or multiple weapon systems. Successful designation of a target to a weapon system whose main guidance is based on radio frequency emissions may only be performed if that target is known to be actively emitting.

When multiple targets are tracked by multiple ownship sensors, the number of tracks generated by each target could be as high as the number of sensors, and thus in the presence of numerous targets it becomes imperative to generate and maintain a coherent tactical picture of the environment, in which each target is represented by a unique global track. In a dense environment, an accurate tactical picture free of redundancies, conflicts and ambiguities can only be obtained by employing an automatic data fusion algorithm (procedure), which correctly and efficiently combines data generated by the ownship sensors into a global (central) track file. When individual sensor track files are maintained for each sensor, the multi-sensor integration typically involves a track-to-track association process which provides links (associations) between the sensor tracks potentially representing the same targets, and then fuses the data of the associated tracks.

Any multi-sensor track-to-track association employs an assignment scheme between the members of the different track files that it operates on. As an example, a radar/ESM track association operates on a radar track file and an ESM track file, and may assign a radar track to each ESM track, if certain association criteria are met. Such an assignment scheme, operating on two track files, is 2-dimensional. To determine the associations between a set of radar tracks and a set of ESM tracks means to establish a set of rules assigning the radar tracks to ESM tracks or the ESM tracks to radar tracks. The assignments could be one-to-one (when each radar track may only be linked to at most one ESM track and each ESM track may only be linked to at most one radar track) or many-to-one (e.g., when a radar track may be linked to more than one ESM track).

In case of a radar/IR/ESM track association, its assignment scheme operates on three track files: the radar track file, the IR track file and the ESM track file. Such an assignment scheme, operating on three track files, is 3-dimensional. Ideally, for each target which generates a track in each one of the three track files, those tracks should be associated to each other. When a tri-sensor track association procedure is based on first making 2-dimensional assignments (i.e., pairwise associations), conflicts and ambiguities may arise when the final 3-dimensional assignments (which we call global associations) are made. To illustrate such a conflict, an IR track and an ESM track may have pairwise links to the same radar track but not to each other. A new 3-dimensional assignment method which resolves such conflicts and ambiguities is the subject of this invention.

The following references are related to the subject matter of this invention and are described below:

[1] J. W. Thomas, A Radar-ESM Correlation Discriminant Using Bearing History, JHU/APL Report F3A-79-2-085, March 1979.

[2] G. V. Trunk and J. D. Wilson, Association of DF Bearing Measurements With Radar Tracks, IEEE Transactions on Aerospace and Electronic Systems, Vol. AES-23, No. 4, July 1987, pp. 438–447.

[3] C. L. Morefield and C. M. Peterson, Data Association Algorithms for Large Area Surveillance, ORSA/TIMS Meeting, ORINCON Corp., May, 1978, La Jolla, CA 1978, DTIC AD-A086606/1.

[4] C. B. Chang and L. C. Youens, Measurement Correlation For Multiple Sensor Tracking in a Dense Target Environment, Technical Report 549, Lincoln Laboratory, MIT, Lexington, Mass., Jan. 20, 1981, DTIC AD-A098001.

[5] C. L. Bowman and M. Gross, Multi-Sensor Multi-Platform Track Association Algorithm Using Kinematics and Attributes, IEEE National Aerospace and Electronics Conference, Dayton, May 20–24, 1985, vol. 1, pp. 204–208.

[6] S. S. Blackman, Multiple-Target Tracking with Radar Applications, Artech House, Norwood, Mass., 1986, pp. 363–367.

[7] E. Davis, The Mission Avionics Sensor Synergism (MASS) Program, Proceedings of the 1987 Tri-Service Data Fusion Symposium, Jun. 9–11, 1987. JHU/APL, Laurel, Md., Published by NADC, Warminster, Pa., 1987, pp. 366–372.

[8] W. R. Ditzler, D. W. Cowan, A.G. Sutton and E. Benites, Integrated Multisensor Tracking, Proceedings of the U.S. DoD Tri-Service Combat Identification Systems Conference, Arlington, Va. 1986.

[9] E. Benites, P. R. Decker, W. R. Ditzler and A. G. Sutton, A Demonstration of Multisensor Tracking, Proceedings of the 1987 Tri-Service Data Fusion Symposium, Jun. 9–11, 1987, JHU/APL, Laurel, Md., Published by NADC, Warminster, Pa., 1987, pp. 303–311.

Radar/ESM track association algorithms have been known for some time [1] and continue to be the subject of research [2]. Algorithms are known which allow multiple ESM tracks to link with a single radar track but not vice versa, keep positional association (PA) lists of candidate radar tracks for association with each ESM track based on historical azimuth proximity, form links only when high confidence associations are obtained, and resolve ambiguities based on a sequential probability ratio test. The algorithm described in [1] keeps a running bearing difference history for each candidate track pair, and uses it, as a fine discriminant, to resolve association ambiguities, allowing one-to-one associations only. The logic proposed in [2] allows multi-links and uses a multiple hypothesis testing method based on the chi-squared distributed observed squared error in bearing.

One association algorithm, designed to integrate a radar system and an ESM system in support of a missile system homing on target radio frequency emissions, uses PA lists, allows multi-links reflecting different sensor resolution capabilities, employs a running time average absolute value bearing difference history for fine discrimination, and makes immediate association decisions for all ESM tracks when they receive updates, and periodically each radar scan.

References [3–9] describe multi-sensor track association algorithms which could integrate three or more sensors. The logic proposed in [6], and the logics [5] and [7–9], are based on sequentially pairwise associations involving 2-dimensional assignment logics, and fusion of tracks into central level tracks. Such logics may not detect global conflicts or ambiguities and are likely to propagate association errors. The algorithm described in [8] and [9] is a modification of [7] which employs a one-to-one assignment logic, a clustering and centroiding logic, and a splitting and merging logic to account for the different resolution capabilities of the radar and IR sensor. The computational complexity of such an algorithm could be prohibitive in applications using limited data processing capabilities. Reference [3] shows that the association problem is an assignment problem, notes that no efficient method for finding the optimal solution to the multi-dimensional (i.e., of dimension at least 3) assignment problem is known, and proposes a suboptimal solution recommended for low density environments, and allowing multi-links. The multi-link structure thus obtained may not be consistent with the specific target resolution capabilities of the different sensors. The association algorithm proposed in [4] is based on using Kalman filter residuals as measures of track similarity and reducing the one-to-one multi-dimensional assignment problem to a 0-1 integer programming problem. The run time of the integer program is shown, however, to grow exponentially with the number of potential correlations.

SUMMARY OF THE INVENTION

A new tri-sensor track association method is disclosed, which operates on ranked dissimilar sensor track candidate pairs and measures of their proximity, and allows multilinks (i.e., multiple associations) reflecting different sensor target resolution capabilities. The track association involves an original 3-dimensional assignment scheme, is simple enough to be implemented in real-time, preserves the most pairwise links (highest ranked pairs), requires at least two pairwise links for any tri-sensor global track association, and minimizes the time average statistical bearing displacement between associated tracks.

A tri-sensor track assignment system in accordance with the invention is particularly useful in automatically integrating the track files of collocated radar, infrared (IR) and electronic support measures (ESM) sensors, when conflicts or ambiguities resulting from independently processed pairwise associations (e.g., situation where two dissimilar sensor tracks are linked with the same third sensor track but are not linked to each other) must be resolved in order to generate a non-redundant and consistent list of multi-sensor global track associations.

The use of the tri-sensor association for resolving global conflicts resulting from pairwise links has the advantage of generating a realistic multi-link structure reflecting the different sensor target resolution capabilities, while preserving most of the pairwise links. At the same time the system is simple enough to allow real-time implementation.

A 3-dimensional track assignment system in accordance with the invention may be employed as a building block of a tri-sensor integration system which first forms ranked candidate pairs and performs 2-dimensional assignments (pairwise associations) and then resolves global conflicts and makes the final 3-dimensional assignments. Such an integration approach has the advantage of a modular structure assuring adequate performance in case of sensor degradation. It also requires less processing than other multi-sensor track association algorithms because it does not require combining the associated tracks into fused global tracks. Another feature of the algorithm which adds simplicity, quick response to sensor updates and implementation convenience, is the local nature of the global association processing, as described herein below.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
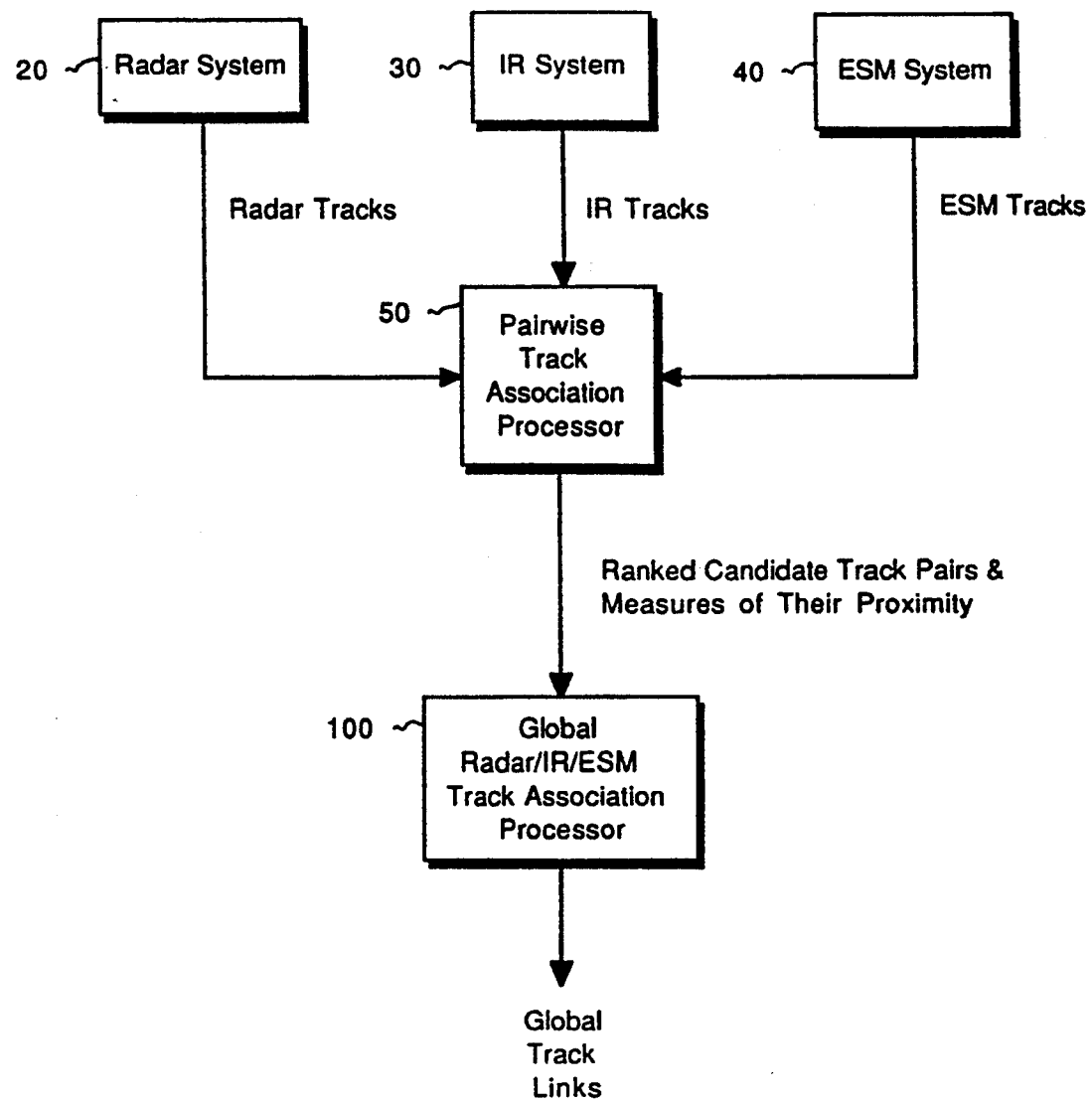
FIG. 1 is a simplified block diagram of a Radar/IR/ESM track association system embodying the invention.

A simplified block diagram of a tri-sensor track association system employing the invention is shown in FIG. 1. The system includes a radar system generally indicated as element 20, an IR system generally indicated as element 30, and an ESM system generally indicated as element 40. The radar system 20 outputs radar tracks. The IR System 30 outputs IR tracks. The ESM System 40 outputs ESM tracks.

Each of the sensors 20, 30 and 40 is well known in the art. The particular form of each such sensor is per se not a part of the present invention. Accordingly the sensors are not described in detail herein.

The pairwise association processor 50 processes the radar tracks, the IR tracks and the ESM tracks as input track data, and provides pairwise associations, ranked candidate track pairs and measures of their proximity as output data. These data are then used as input data for the global association processor 100, which performs the final 3-dimensional track assignment. In the preferred embodiment, the processor 100 comprises a digital computer programmed to perform the functions herein below described.

The formation and updating of pairwise track associations and candidate track pairs ranked by measures of their proximity, as performed by processor 50, is already known in the art, as described above in the Background of the Invention.

The preferred embodiment of the invention is for a ship self-defense application. Such an application is more particularly described in "Automatic Radar/IR/ESM Track Association with Application to Ship Self Defense", John T. Fagarasan and Ronald J. Jakaub, Proceedings of the 1989 Tri-Service Data Fusion Symposium, Vol. 1, pp. 277-286. The entire contents of this paper are incorporated herein by this reference.

Global Association Design Goals

The objective of the Global Radar/IR/ESM Track Association is to resolve ambiguities and conflicts which may arise due to track inaccuracies when pairwise associations are performed as a first step of a Radar/IR/ESM Track Association process.

Figure 2A:
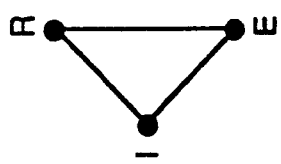
FIGS. 2a-d illustrate various examples of pairwise associations which could be generated by the Pairwise Track Association Processor of FIG. 1.
Figure 2D:
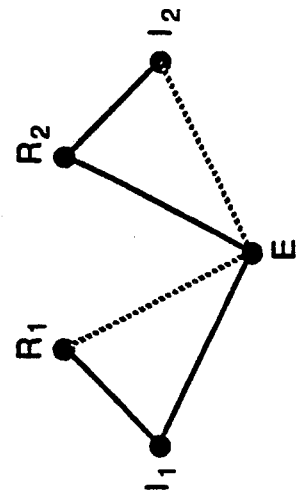
Figure 2C:
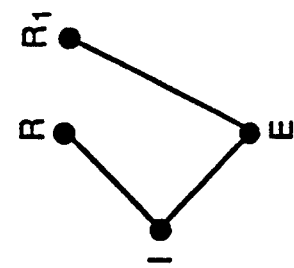
Figure 2B:
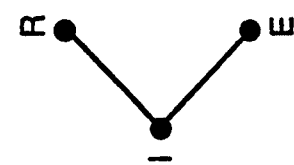

In a case free of ambiguities and conflicts, when a target is tracked by all three sensors, the radar track, the IR track and the ESM track representing that target are all pairwise-linked to each other, forming what we call a "closed triad". This case is depicted in FIG. 2a, where the radar track R, the IR track I and the ESM track E are represented by small circles, and the pairwise links between these tracks are represented by solid lines. Conflicts and ambiguities may arise when one of the pairwise associations between the three tracks described in FIG. 2a is missing, so that the three tracks involved form what we call an open triad. To illustrate such a case, consider an ESM track E and a radar track R pairwise-linked to tile same IR track I but not pairwise-linked to each other. Since tracks R and E are not pairwise-linked to each other, one cannot conclude without further processing whether these 2 tracks represent the same target or not. If tracks R and E are not even candidates for pairwise association (i.e., the decision not to pairwise-associate tracks R and E was made with high confidence) as illustrated in FIG. 2b, then tracks R and E should not represent the same target. If track E is also pairwise linked to another radar track, say R1, as illustrated in FIG. 2c, the case becomes also ambiguous, since track E could represent the same larger as track R, or the same track as track $R_1$. If the track E is pairwise-associated to IR track $I_1$ and radar track $R_2$, and track E is a candidate for pairwise association with radar track $R_1$ and IR track $I_2$ (the candidate pairwise links are represented by dotted lines in our figures), as illustrated in FIG. 2d, the situation is ambiguous since either track E represents the same target as tracks $R_1$ and $I_1$, or the same target as tracks $R_2$ and $I_2$.

The design goal of the Global Radar/IR/ESM Track Association is to process conflicts and ambiguities by generating global associations ( where global associations represent final association decisions), so that most pairwise links become global links. In particular, the goal for processing open triads was set to generate global closed triads based on at least two pairwise links, and such that all global links are at least candidates for pairwise links (i.e., all the track pairs involve members of pairwise association candidate lists).

Global Radar/IR/ESM Track Association Description

The subject of this invention is the Global Radar/IR/ESM Track Association. In the association system described in FIG. 1, the global association is performed by the processor 100. Its inputs, outputs, and tile global association processing performed by it are described herein below.

Inputs. The following inputs are needed for the Radar/IR/ESM Global Association Processor. Such inputs are known in the art.

Each IR track has a "radar/IR (R/I) positional association" (PA) list and an "R/I association candidate list" (ACL), consisting of radar tracks which are candidate for association with the given IR track. The R/I ACL is a subset of the R/I PA list. For each radar track in such an R/I PA list, a figure of merit measuring the radar track's angular proximity to the IR track is available. This figure of merit may be used for comparisons between different pairwise associations. In the preferred embodiment this figure of merit is the time average squared normalized bearing difference between the radar and the IR track, and is called the "R/I bearing history" of the radar/IR candidate track pair. For each radar track in an IR track's R/I ACL, a figure of merit used to rank the ACL is available. In the preferred embodiment this figure of merit is called the "R/I discrepancy" of the radar/IR candidate track pair and is calculated as the sum of the bearing history and other figures of merit (an R/I heading figure of merit which penalizes track pairs with conflicting inbound/outbound information, an identification figure of merit which penalizes track pairs with conflicting identification information, and a high confidence link hysteresis figure of merit which penalizes track pairs which have not been linked with high confidence). The smallest discrepancy yields the highest rank. Each IR track is pairwise-linked (i.e., pairwise-associated) to the highest ranked radar track in its R/I ACL, if any.

Each ESM track has a "radar/ESM (R/E) positional association" (PA) list and an "R/E association candidate list (ACL)", consisting of radar tracks which are candidate for association with the given ESM track. The R/E ACL is a subset of the R/E PA list. For each radar track in such an R/E PA list, a figure of merit measuring the radar track's angular proximity to the ESM track is available. This figure of merit may be used for comparisons between different pairwise associations. In the preferred embodiment this figure of merit is the time average squared normalized bearing difference between the radar and the ESM track, and is called the "R/E bearing history" of the radar/ESM candidate track pair. For each radar track in an ESM track's R/E ACL, a figure of merit used to rank the ACL is available. In the preferred embodiment this figure of merit is called the "R/E discrepancy" of the radar/ESM candidate track pair and is calculated as the sum of the bearing history and other figures of merit (an R/E heading figure of merit which penalizes pairs of ESM missile tracks and radar tracks with large crossing angles, an identification figure of merit which penalizes track pairs with conflicting identification information, and a high confidence link hysteresis figure of merit which penalizes track pairs which have not been linked with high confidence). The smallest discrepancy yields the highest rank. Each ESM track is pairwise-linked (i.e., pairwise-associated) to the highest ranked radar track in its R/E ACL, if any.

Each ESM track has an "IR/ESM (I/E) positional association" (PA) list and an "I/E association candidate list" (ACL), consisting of IR tracks which are candidate for association with the given ESM track. The I/E ACL is a subset of the I/E PA list. For each radar track in such an I/E PA list, a figure of merit measuring the IR track's angular proximity to the ESM track is available. This figure of merit may be used comparisons between different pairwise associations. In the preferred embodiment this figure of merit is the time average squared normalized bearing difference between the IR and the ESM track, and is called the "I/E bearing history" of the IR/ESM candidate track pair. For each IR track in an ESM track's I/E ACL, a figure of merit used to rank the ACL is available. In the preferred embodiment this figure of merit is called the "I/E discrepancy" of the IR/ESM candidate track pair and is calculated as the sum of the bearing history and other figures of merit (an I/E heading figure of merit which penalizes track pairs with conflicting inbound/outbound information, an identification figure of merit which penalizes track pairs with conflicting identification information, an elevation figure of merit which penalizes track pairs with conflicting elevation information, and a high confidence link hysteresis figure of merit which penalizes track pairs which have not been linked with high confidence). The smallest discrepancy yields the highest rank. Each ESM track is pairwise-linked (i.e., pairwise-associated) to the highest ranked IR track in its I/E ACL, if any.

Definitions. The following terminology is used below. "Link", "linked" mean pairwise-link, pairwise-linked, respectively. If a radar track R has IR links, then R together with all the IR tracks linked to it is called a "strong global track germ" (strong GTG). A radar track with no IR track links is called a "weak radar GTG". An IR track with no radar track links is called a "weak IR GTG". The radar track of a strong GTG or a weak radar GTG is called the "leader" of that GTG. The IR track of a weak IR GTG is called the "leader" of that GTG.

A strong GTG with leader R is said to be "eligible for global association" with an ESM track E if either 1) E is linked with R and at least one IR track in GTG is in the I/E ACL of E, or 2) E is linked with at least one IR track in GTG and R is in the R/E ACL of E. We define the "bearing displacement" BD between E and a strong GTG eligible for global association with E as:

$$BD(E,GTG) = BH(R,E) + \min_I \{BH(R,I) + BH(I,E)\}$$

where the minimum is taken over all IR tracks I linked with R and contained in E's I/E ACL, and BH means bearing history.

A weak radar GTG is said to be "eligible for global association" with an ESM track E if the leader of the GTG is in E's R/E ACL. A weak IR GTG is said to be "eligible for global association" with an ESM track E if the leader of the GTG is in E's I/E ACL. The weak radar GTG with track of smallest R/E discrepancy among all weak radar GTG's eligible for association with E, if any, is the "best choice weak radar GTG" for association with E. The weak IR GTG with track of smallest I/E discrepancy among all weak IR GTG's eligible for association with E, if any, is the "best choice weak IR GTG" for association with E.

Global Association. Each ESM track E is processed for global association as follows.

1. A search is performed to find the strong GTG's eligible for global association with track E. If any such GTG is found, then E is "globally associated" with the strong GTG eligible for association with E which has the smallest bearing displacement BD from E. If no such GTG is found, the following processing is performed.

2. A search is performed to find the weak radar GTG's and the weak IR GTG's eligible for global association with E. If any such GTG is found, then E is "globally associated" to either the weak radar GTG eligible for association with E which has the smallest R/E discrepancy from E, or to the weak IR GTG eligible for association with E which has the smallest I/E discrepancy from E, whichever has the leader track with the smallest bearing history from track E. If no such weak GTG is found, the following processing is performed.

3. Track E is declared not globally linked to any other tracks.

The global associations are established after track initiation and reestablished periodically each radar scan.

Outputs. For each ESM track, the output of the Global Radar/IR/ESM Track Association Processor 100 of FIG. 1 is the global association status of the said ESM track, including its global associations (links) to radar and IR tracks, if any.

Exemplary Implementation of Global Association

FIGS. 3a–d illustrate an exemplary detailed flow diagram of a searching procedure yielding the eligible GTG's for association with any given ESM track, and the assignment method implementing the global association process according to the invention. The following terminology and acronyms are used in the drawings. "Linked" means pairwise-associated, "globally linked" means globally associated, I/E=IR/ESM, R/E=radar/ESM, ACL=Pairwise Association Candidate List, GAClri=Global Association Candidate List of radar tracks with IR links, BH=bearing history. The flow diagram is described herein below.

Figure 3A:
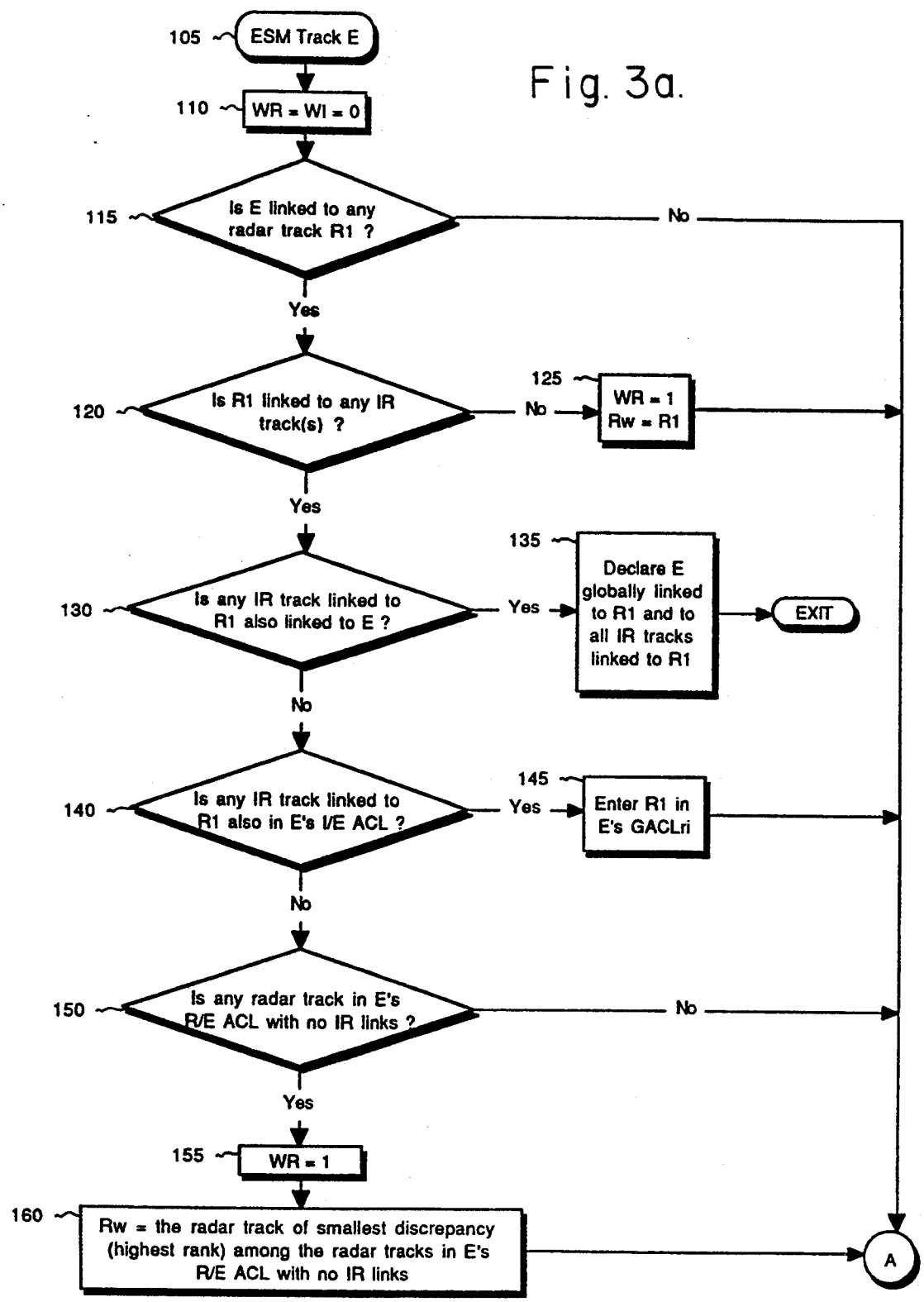
FIGS. 3a-d illustrate an exemplary detailed flow diagram of the global association function performed in accordance by the Global Radar/IR/ESM Track Association processor of the system of FIG. 1.

Referring to FIG. 3a, the described processing is performed for any given ESM track E (105). First (110), the weak radar GTG flag WR and the weak IR GTG flag WI are both set equal to zero. If the ESM track E is not linked (pairwise associated) to any radar track R1 (115), the operation proceeds to node A. If the ESM track E is linked to a radar track R1 which is not linked to any IR tracks, the weak radar GTG flag WR is set equal to 1, the radar track R1 is denoted by Rw (125), and the operation proceeds to node A. If the ESM track E is linked to a radar track R1 which has IR links, and at least one IR track linked to R1 is also linked to the ESM track E (130), then the ESM track E is declared globally linked to the radar track R1 and all the IR tracks linked to R1, and the operation is terminated. If the ESM track E is linked to a radar track R1, which is linked to one or more IR tracks, such that none of these IR tracks is linked to the ESM track E (140) but at least one of them is in E's I/E ACL, then the GTG formed by radar track R1 and all IR tracks linked to it is declared eligible for global association with E, the radar track R1 is entered in E's Global Association Candidate List of radar tracks with IR links (GACLri) (145), and the operation proceeds to node A. If the ESM track E is linked to a radar track R1 which is linked to one or more IR tracks, such that none of these IR tracks is in E's I/E ACL (150), and there are no radar tracks without IR links in E's R/E ACL, then the operation proceeds to node A. If the ESM track E is linked to a radar track R1 which is linked to one or more IR tracks, such that none of these IR tracks is in E's I/E ACL, and ESM track E has at least a radar track without IR links in its R/E ACL, then the weak radar GTG flag WR is set equal to 1, the radar track of smallest discrepancy among the radar tracks with no IR links in E's R/E ACL is denoted by Rw, and the operation proceeds to node A.

Figure 3B:
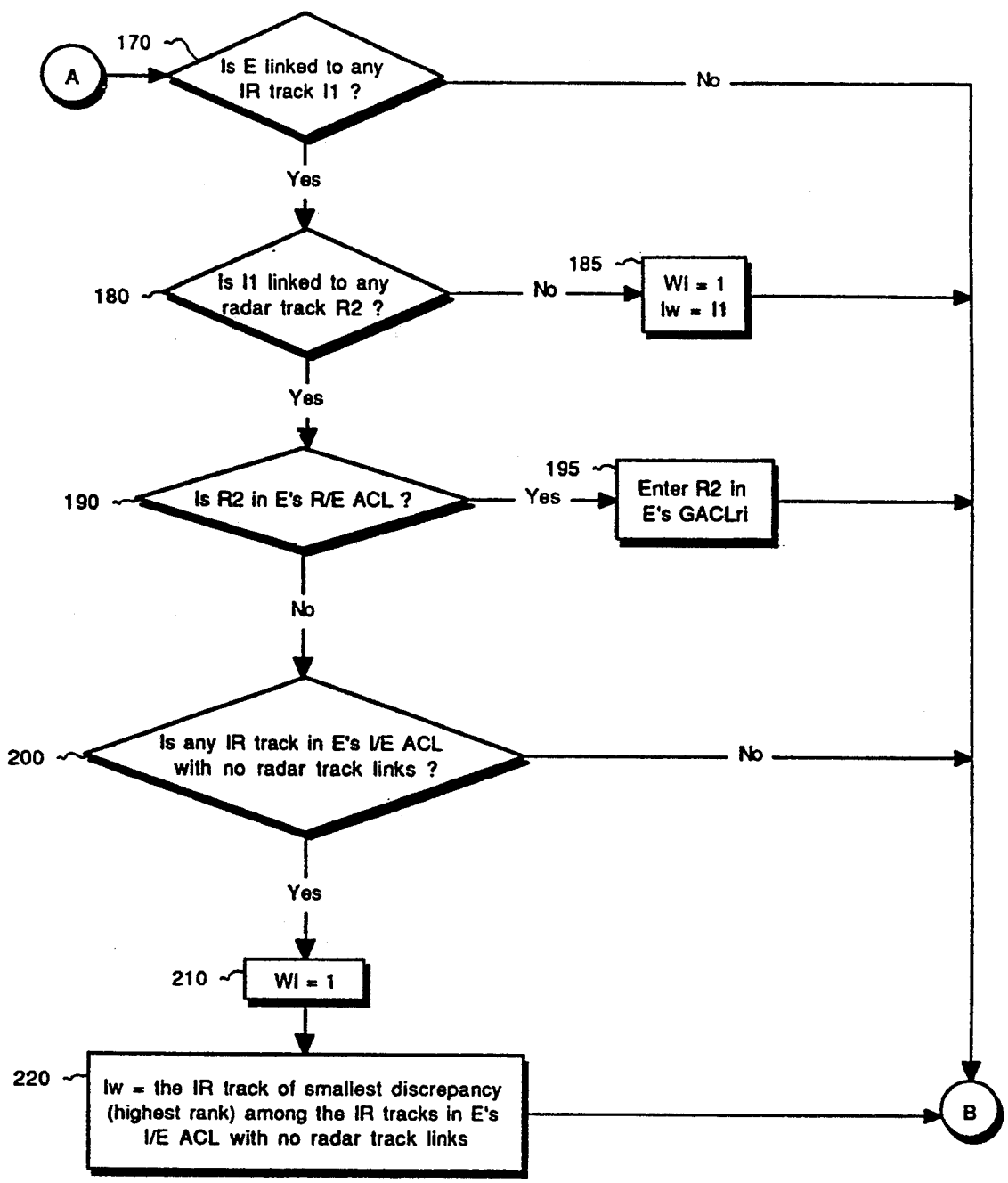

Referring to FIG. 3b, the processing for node A is as follows. If the ESM track E is not linked to any IR track (170), the operation proceeds to node B If the ESM track E is linked to an IR track I1 (180) which is not linked to any radar track, the weak IR GTG flag WI is set equal to 1, the IR track I1 is denoted by Iw (185), and the operation proceeds to node B. If the ESM track E is linked to an IR track I1 which is linked to a radar track R2 (190), and R2 is in E's R/E ACL, then the GTG formed by radar track R2 and all IR tracks linked to it is declared eligible for global association with E, the radar track R2 is entered in E's GACLri) (195), and the operation proceeds to node B. If the ESM track E is linked to an IR track I1 which is linked to a radar track R2 which is not in E's R/E ACL (200), and there are no IR tracks without radar links in E's I/E ACL, then the operation proceeds to node B. If the ESM track E is linked to an IR track I1 which is linked to a radar track R2 which is not in E's R/E ACL, and ESM track E has at least an IR track without radar links in its I/E ACL, then the weak IR GTG flag WI is set equal to 1, the IR track of smallest discrepancy among the IR tracks with no radar links in E's I/E ACL is denoted by Iw, and the operation proceeds to node B.

Figure 3C:
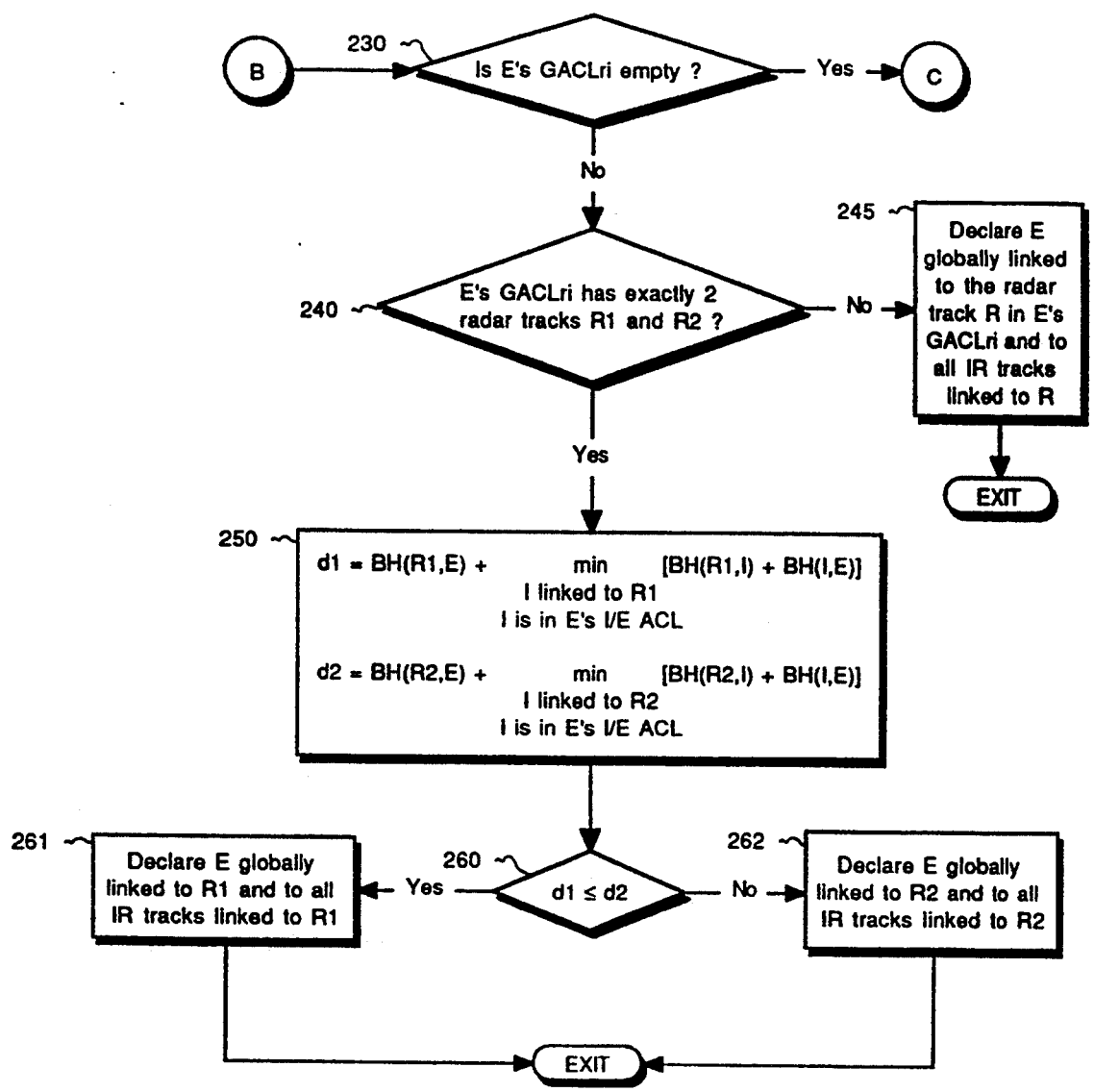

Referring to FIG. 3c, the processing for node B is as follows. If (230) E's GACLri is empty, i.e., there is no strong GTG eligible for association with ESM track E, then the operation proceeds to node C. If (240) E's GACLri is not empty and the number of radar tracks in it is not two (i.e., there is exactly one strong GTG's eligible for association with E), then (245) track E is declared globally linked to the radar track R in E's strong GTG eligible for association with E, and to all IR tracks linked to R, and the operation is terminated. If E's GACLri is not empty and the number of radar tracks in it is exactly two (i.e., there are exactly two strong GTG's eligible for association with E), and the radar tracks in those GTG's are R1 and R2 respectively, the bearing displacements d1 and d2 of the two GTG's are calculated as described in 250. If (260) $d1 \leq d2$, then (261) track E is declared globally linked to the radar track R1, and to all IR tracks linked to R1, and the operation is terminated. If $d1 > d2$, then (262) track E is declared globally linked to the radar track R2, and to all IR tracks linked to R2, and the operation is terminated.

Figure 3D:
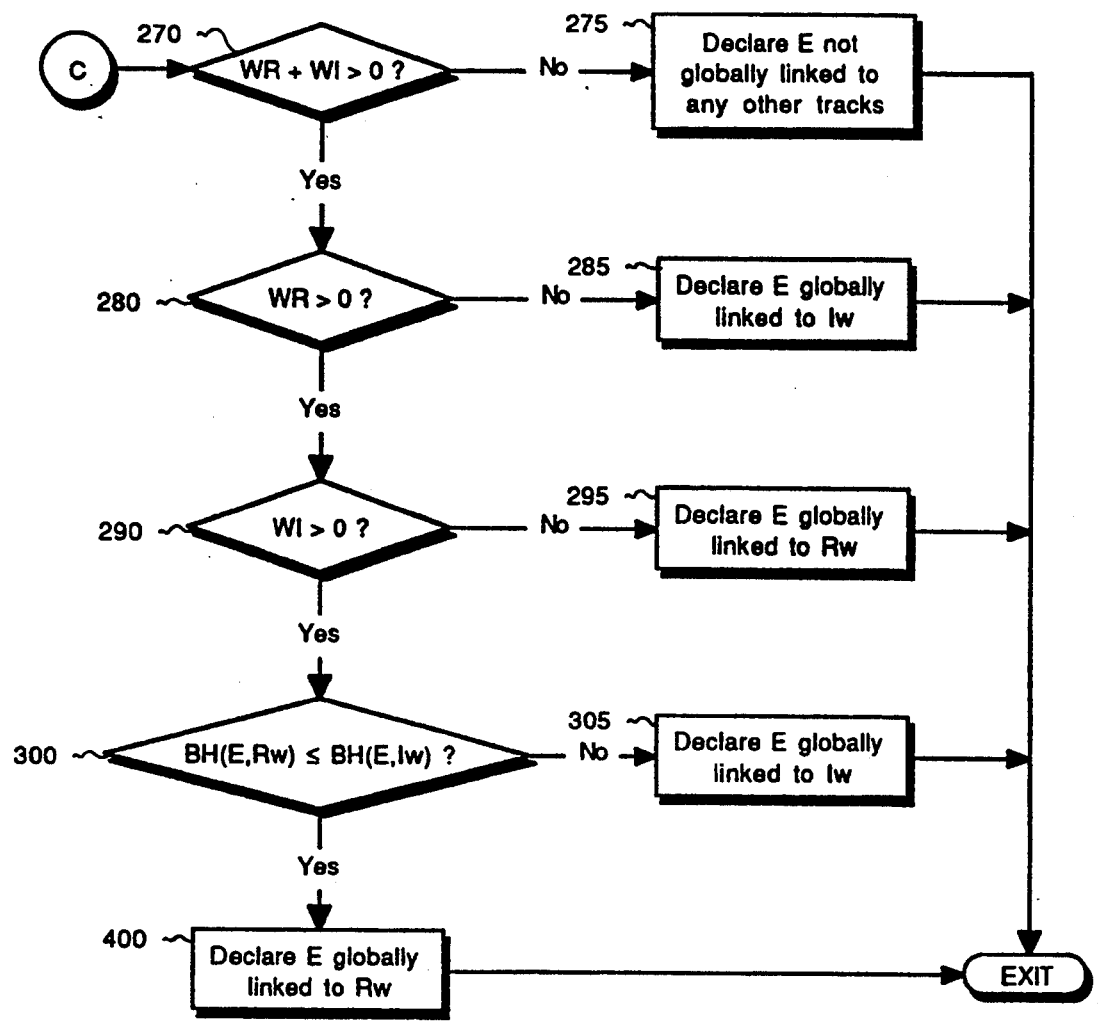
Figures 4A, 4B, 4C, 4D, 4E, 4F, 4G, 4H, 4I, 4J, 4K, 4L, 4M:
FIGS. 4a-m illustrate the types of global associations which could be generated by the Global Radar/IR/ESM Track Association Processor of FIG. 1.

Referring to FIG. 3d, the processing for node C is as follows. If WR+WI=0, then (275) track E is declared not globally linked to any other tracks and the operation is terminated. If WR+WI>0 and (280) WR=0, track E is declared globally linked to the IR track Iw and the operation is terminated. If WR+WI>0 and (295) WI=, track E is declared globally linked to the radar track Rw and the operation is terminated. If WR>0, WI>, and (300) the bearing history between E and the IR track Iw is smaller than the bearing history between E and the radar track Rw, then (305) track E is declared globally linked to the IR track Iw and the operation is terminated. If WR>0, WI>0, and (400) the bearing history between E and the IR track Iw is not smaller than the bearing history between E and the radar track Rw, then track E is declared globally linked to the radar track Rw and the operation is terminated.

What is claimed is:

1. A tri-sensor track assignment system employing track association based on ranked candidate pairs, comprising:
   a radar sensor for providing radar tracks, each track characterized by a collection of data enabling an estimate of a target's position and velocity;
   an infrared (IR) sensor for providing IR tracks, wherein each IR track is characterized by target range and elevation data enabling an estimate of the target's position in respect to range and elevation;
   an electronic support measure (ESM) sensor providing an ESM track, each track characterized by bearing and waveform data regarding a target;
   a system processor responsive to said radar, IR and ESM tracks for processing said tracks and providing a global track list of global tracks, comprising means for forming and updating pairwise association lists between respective ones of the tracks to provide ranked pairwise association lists for the radar/IR pairs, the radar/ESM pairs and IR/ESM pairs;

means for forming strong and weak global track germs (GTG's) from said tracks and said pairwise association lists; and means for processing the pairwise lists and the respective targets to perform global association of ESM tracks with the strong and weak global track germs to provide said global track lists, said means comprising means for defining for each ESM track a list of strong GTG's and a list of weak GTG's eligible for association with that ESM track, means for globally associating each ESM track with the best choice eligible strong GTG, if any, and means for globally associating a particular ESM track with the best choice weak GTG, if any, if no strong GTG is eligible for association with that particular ESM track.

2. The system of claim 1 wherein each ranked pairwise association (PA) list for the radar/IR track pairs is characterized in that each IR track is linked to the highest ranked radar track in its PA list, said tracks being ranked by an R/I bearing history discrepancy figure of merit; the ranked ESM/radar PA lists for each ESM track are ranked by an R/E bearing history figure of merit and the ESM track is linked to the highest ranked radar track in the list; and the ranked ESM/IR PA lists for each ESM track are ranked by an I/E bearing history figure of merit, and the ESM track is linked to the highest ranking IR track in the list.

3. The system of claim 1 wherein said means for forming strong and weak global track germs comprises:
 (a) for each radar track R having IR track links, means for forming a strong global track germ characterized by the radar track R and all IR tracks linked to it;
 (b) means for forming a weak global track germ for each radar track with no IR tracks linked to it;
 (c) means for forming a weak global track germ for each IR track with no radar track linked to it.

4. A tri-sensor track assignment method employing track association based on ranked candidate pairs, comprising a sequence of the following steps:
 providing radar tracks, each track characterized by a collection of data enabling an estimate of a target's position and velocity;
 providing infrared (IR) tracks, wherein each IR track is characterized by target range and elevation data enabling an estimate of the target's position in respect to range and elevation;
 providing an electronic support measures (ESM) track, each track characterized by bearing and waveform data regarding a target;
 processing said radar, IR and ESM tracks to provide global track list of global tracks, said processing comprising forming and updating pairwise association lists between respective ones of the tracks to provide ranked pairwise association lists for the radar/IR pairs, the radar/ESM pairs and IR/ESM pairs, forming strong and weak global track germs (GTG's) from said tracks and said pairwise association lists, processing the pairwise lists and the respective targets to perform global association of ESM tracks with the strong and weak global track germs to provide said global track lists, said processing the pairwise lists including the steps of defining for each ESM track a list of strong GTG's and a list of weak GTG's eligible for association with that ESM track, globally associating each ESM with the best choice eligible strong GTG, if any, and if no strong GTG is eligible for association with a particular ESM track, globally associating that ESM track with the best choice weak GTG, if any.

5. The method of claim 4 wherein each ranked pairwise association (PA) list for the radar/IR track pairs is characterized in that each IR track is linked to the highest ranked radar track in its PA list, said tracks being ranked by an R/I bearing history discrepancy figure of merit; the ranked ESM/radar PA lists for each ESM track are ranked by an R/E bearing history figure of merit and the ESM track is linked to the highest ranked radar track in the list; and the ranked ESM/IR PA lists for each ESM track are ranked by an I/E bearing history figure of merit, and the ESM track is linked to the highest ranking IR track in the list.

6. The method of claim 4 wherein said steps forming strong and weak global track germs comprises:
 (a) for each radar track R having IR track links, forming a strong global track germ characterized by the radar track R and all IR tracks linked to it;
 (b) forming a weak global track germ for each radar track with no IR tracks linked to it; and
 (c) forming a weak global track germ for each IR track with no radar track linked to it.

7. A method for performing global association processing of the respective radar, infrared (IR) and electronic support measures (ESM) tracks from a tri-sensor system providing such radar, IR and ESM tracks, and wherein the sensor system provides (i) for each IR track, a radar/IR (R/I) positional association (PA) list and an association candidate list (ACL) subset of the PA list, wherein each IR track is linked to the highest ranked radar track in its R/I ACL, (ii) for each ESM track, a radar/ESM (R/E) positional association (PA) list and an association candidate list (ACL) subset of the PA list, wherein each ESM track is linked to the highest ranked radar track its R/E ACL, and (iii) for each ESM track, an IR/ESM (I/E) positional association (PA) list and an association candidate list (ACL) subset of the PA list, wherein each ESM track is linked to the highest ranked IR track in its I/E ACL, the method including the steps of:
 (a) for each radar track R having IR track links, forming a strong global track germ (GTG) comprising the radar track R and all IR tracks linked to it;
 (b) for each radar track with no IR tracks linked to it, forming a weak radar GTG comprising that radar track;
 (c) for each IR track with no radar track linked to it, forming a weak IR GTG comprising that IR track;
 (d) for each ESM track, defining a list of strong GTG's eligible for association with that ESM track;
 (e) for each ESM track, defining a list weak GTG's eligible for association with the ESM track;
 (f) globally associating each ESM track with an eligible strong GTG, if any; and
 (g) if no strong GTG is eligible of association with a particular ESM track, globally associating that ESM track with the best choice weak GTG, if any.

8. The method of claim 7 further comprising the step of:
 (h) for each ESM track which does not associate with any GTG, declaring that ESM track not globally associated with any other tracks.

9. The method of claim 7 wherein a strong GTG is declared eligible for association with the ESM track if and only if either (1) the ESM track is linked with the radar track R in said GTG and at least one IR track in said GTG is in the I/E ACL of the ESM track, or (2) the ESM track is linked with one IR track in said GTG and the radar track R in said GTG is in the R/E ACL of the ESM track.

10. The method of claim 7 wherein a weak radar GTG is declared eligible for association with an ESM track E if and only if the radar track in said weak GTG is in the track E's R/E ACL.

11. The method of claim 7 wherein the best choice weak radar global track germ is defined as that weak radar GTG with the radar track of a smallest R/E discrepancy figure of merit among all weak radar GTG's eligible for association with the ESM track, if any.

12. The method of claim 7 wherein a weak IR global track germ is declared eligible for association with an ESM track E if and only if the IR track in said weak GTG is in the track E's I/E ACL.

13. The method of claim 7 wherein the best choice weak IR GTG is defined as that weak IR GTG with the track of the smallest I/E discrepancy among all weak IR GTG's eligible for association with the ESM track, if any.

14. The method of claim 7 wherein the best choice weak GTG is defined as the best choice weak radar GTG or the best choice IR GTG, whichever has the smallest bearing history from the ESM track.

* * * * *